Nov. 17, 1964 — A. VAN DER LELY — 3,157,403
AGRICULTURAL IMPLEMENTS
Filed Aug. 8, 1961 — 7 Sheets-Sheet 1
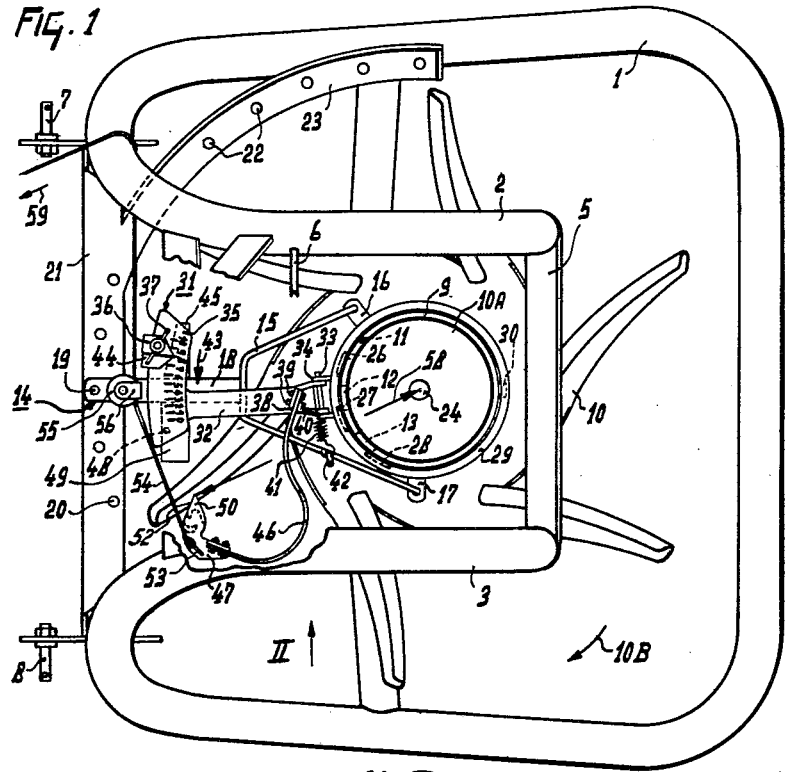
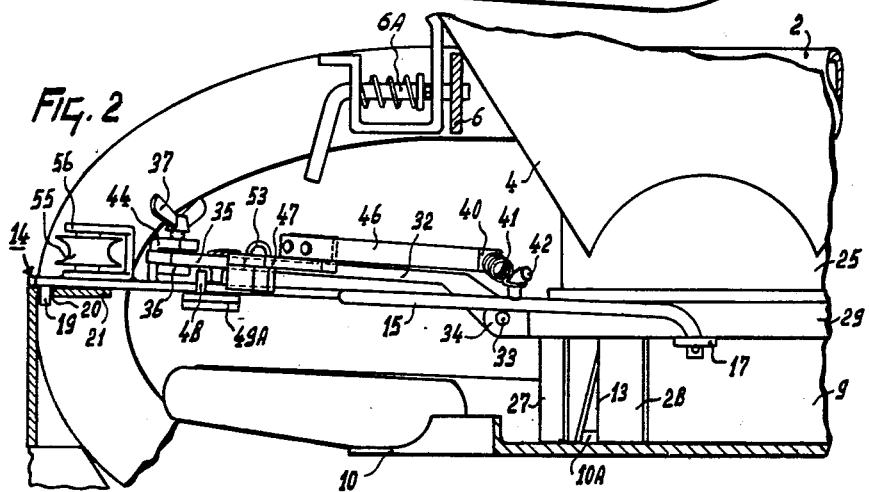
INVENTOR.
ARY VAN DER LELY
BY
Mason, Mason & Albright
Attorneys

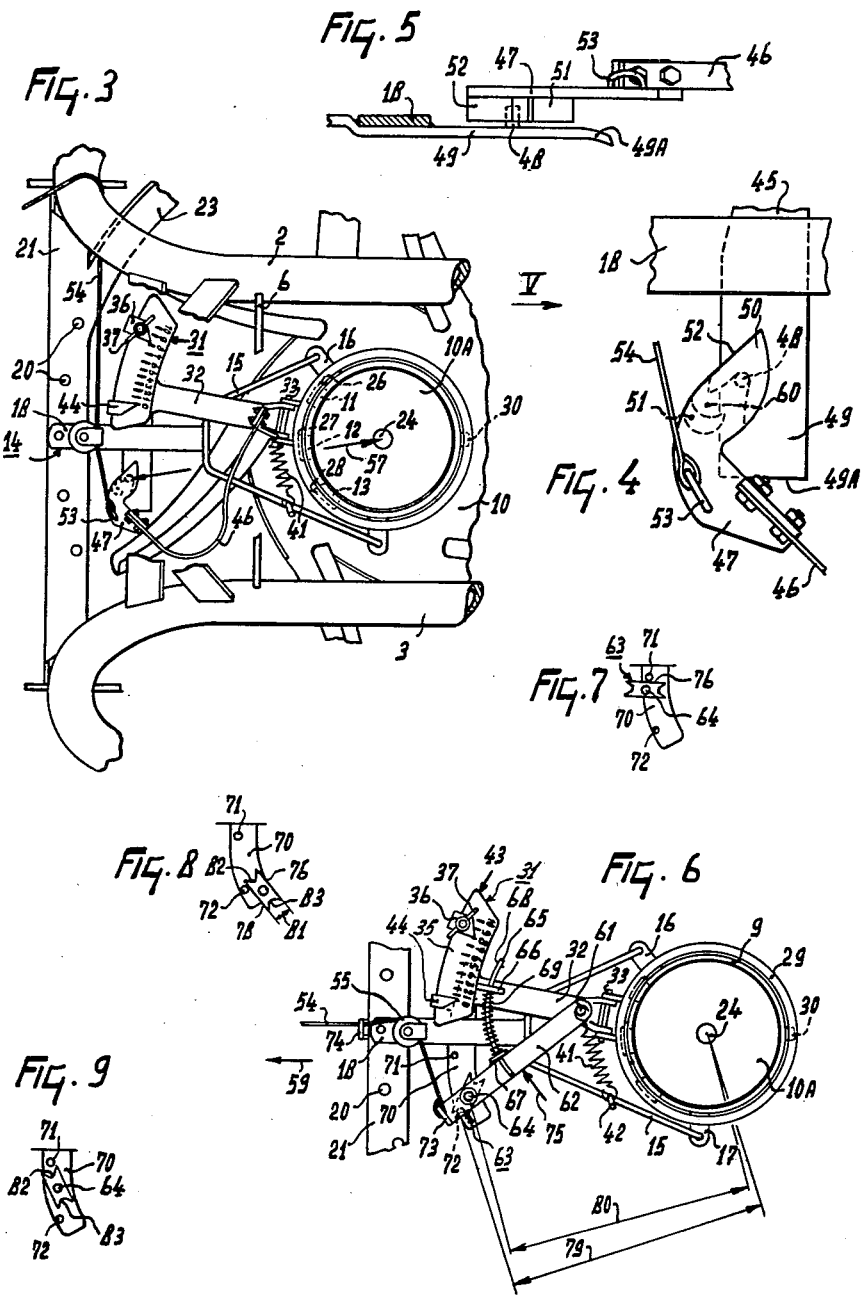

Nov. 17, 1964 A. VAN DER LELY 3,157,403
AGRICULTURAL IMPLEMENTS

Filed Aug. 8, 1961 7 Sheets-Sheet 5

INVENTOR.
ARY VAN DER LELY
BY
Mason, Mason & Albright
ATTORNEYS

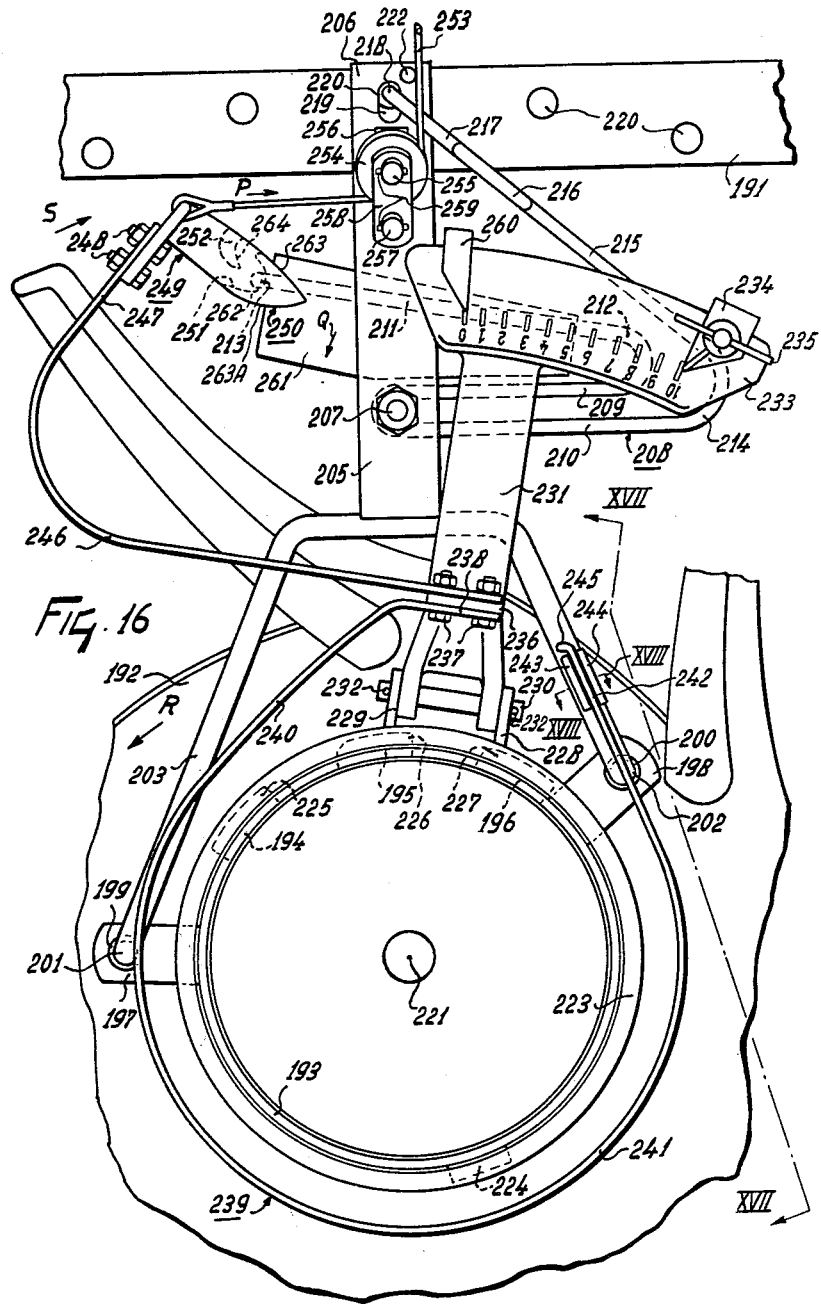

United States Patent Office 3,157,403
Patented Nov. 17, 1964

3,157,403
AGRICULTURAL IMPLEMENTS
Ary van der Lely, Maasland, Netherlands, assignor to C. van der Lely N.V., Maasland, Netherlands, a limited-liability company of the Netherlands
Filed Aug. 8, 1961, Ser. No. 130,092
Claims priority, application Netherlands Aug. 26, 1960
20 Claims. (Cl. 275—15)

This invention relates to agricultural implements.

An object of the invention is the provision of an implement in which a member which is required to be adjustable to any one of at least two different positions relative to another member can be so adjusted in a simple and effective manner.

According to the invention there is provided an agricultural implement including a member which is adjustable to any one of at least two different positions relative to another member and which is adapted to be retained in at least one of these positions, wherein adjusting mechanism is provided which includes two relatively movable elements respectively connected to the two members, one of which elements has a stop and the other a pin, the arrangement being such that the pin and stop can be brought into engagement to retain the adjustable member in a required position, either the stop or the pin being connected to the corresponding element in a resilient manner.

Figure 10:
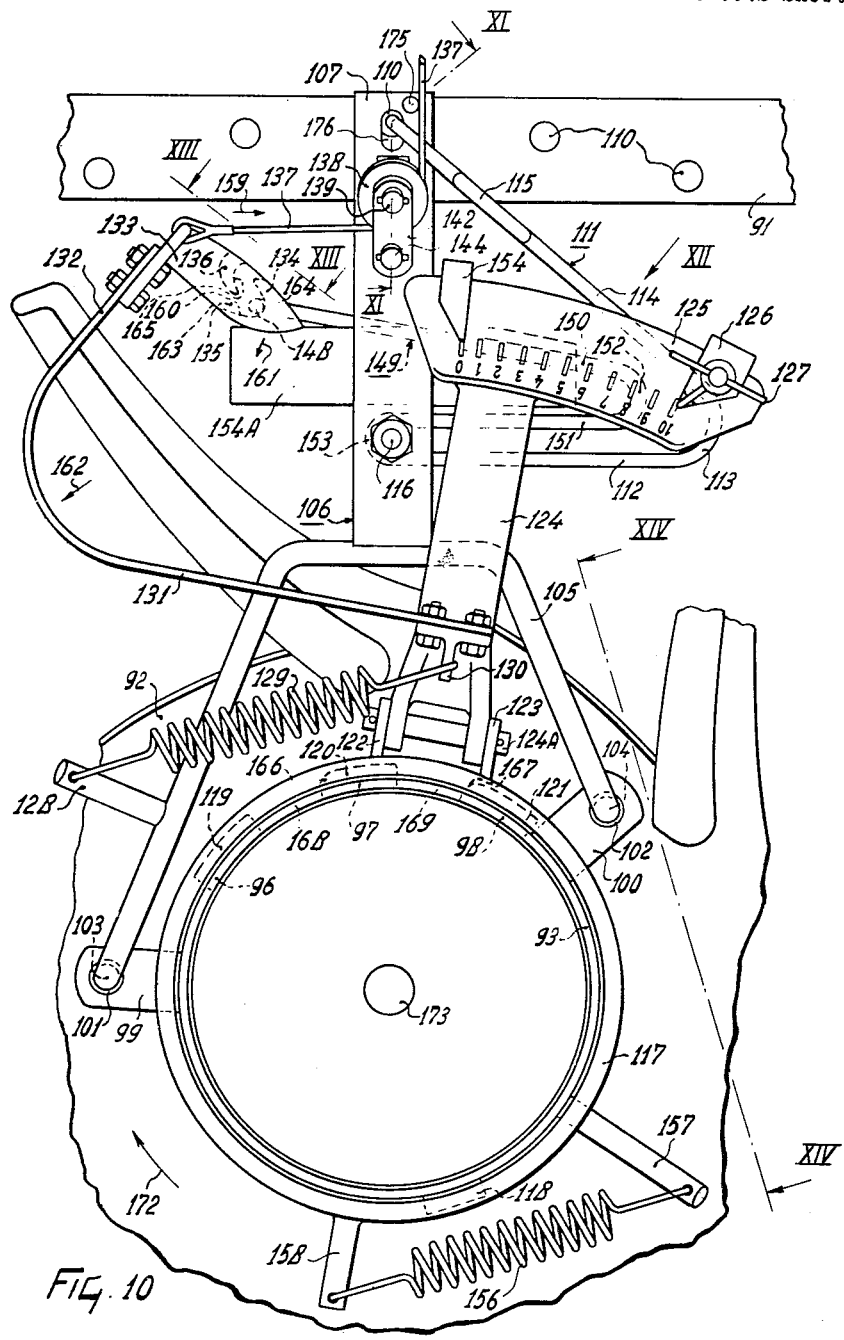
Figure 11:
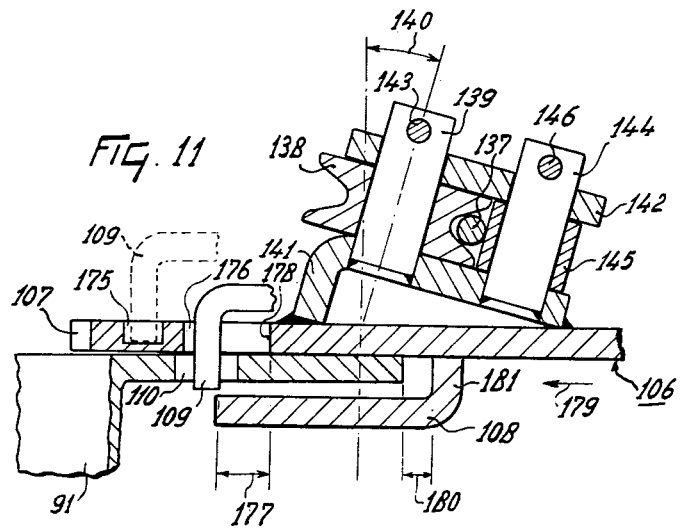
Figure 12:
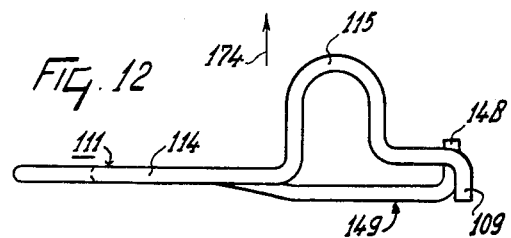
Figure 14:
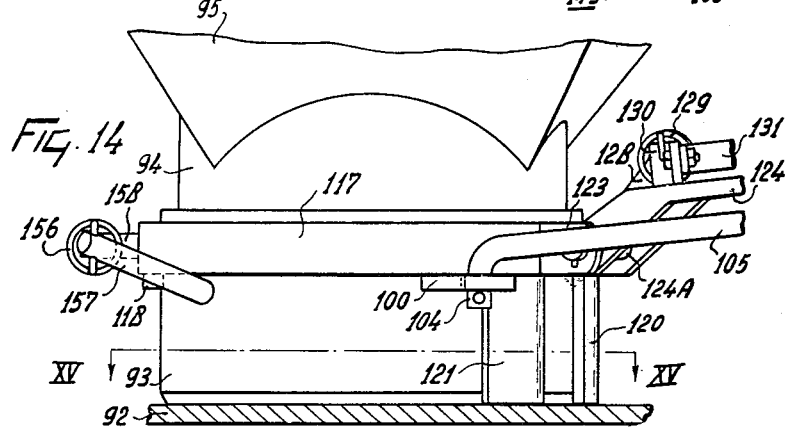
Figure 15:
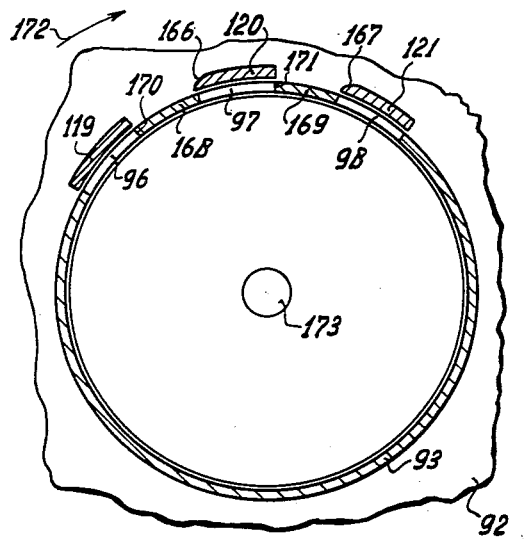
Figure 13:
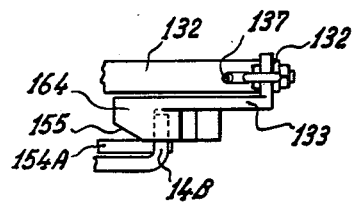
Figure 17:
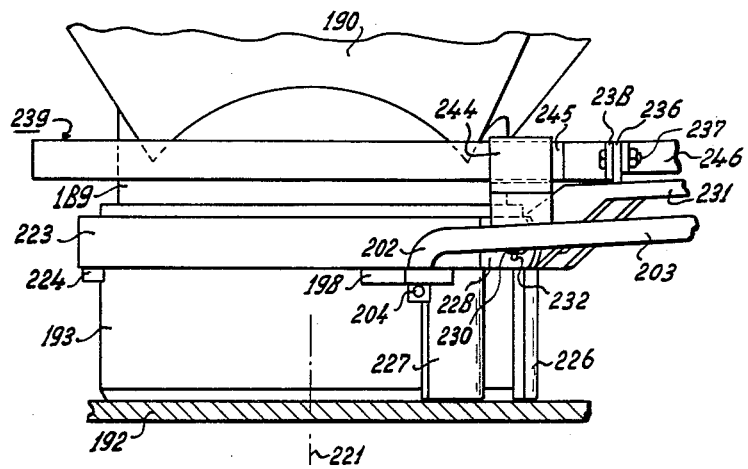
Figure 18:
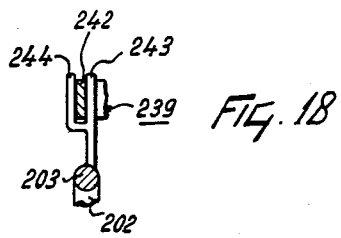

For a better understanding of the invention and to show how the same may be carried into effect reference will now be made, by way of example, to the accompanying drawings, in which:

FIGURE 1 is a plan view of part of an implement for spreading powdered or granular material over the ground, FIGURE 2 is a view, to an enlarged scale, and partly in section, taken in the direction indicated by the arrow II of FIGURE 1, FIGURE 3 is a view similar to FIGURE 1 showing parts of the implement occupying different relative positions, FIGURE 4 is a detailed view, to an enlarged scale, showing parts illustrated in FIGURE 3 in greater detail, FIGURE 5 is a view taken in the direction indicated by the arrow V of FIGURE 4, FIGURE 6 is a plan view corresponding generally to FIGURES 1 and 3 but showing an alternative embodiment of some parts of the implement, FIGURE 7 is a detailed view showing parts illustrated in FIGURE 6 in different relative positions, FIGURE 8 is a further detailed view showing the same parts in further different relative positions, FIGURE 9 is a detailed view showing the same parts as appear in FIGURES 7 and 8 in still further relative positions, FIGURE 10 is a plan view showing an alternative embodiment of parts of an implement for spreading powdered or granular material over the ground, FIGURE 11 is a section, to an enlarged scale, taken on the line XI—XI of FIGURE 10, FIGURE 12 is a view of one part of the implement taken in the direction indicated by the arrow XII of FIGURE 10, FIGURE 13 is a section taken on the line XIII—XIII of FIGURE 10, FIGURE 14 is a section taken on the line XIV—XIV of FIGURE 10, FIGURE 15 is a section taken on the line XV—XV of FIGURE 14, FIGURE 16 is a plan view, similar to FIGURE 10, but showing a further alternative embodiment of part of an implement for spreading powdered or granular material over the ground, FIGURE 17 is a section taken on the line XVII—XVII of FIGURE 16, and FIGURE 18 is a section taken on the line XVIII—XVIII of FIGURE 16.

Referring to FIGURES 1 and 2 of the drawings, the implement comprises a curved beam 1 between the parallel ends 2 and 3 of which a container in the form of a hopper 4 (FIGURE 2) is removably mounted. Transverse strips 5 and 6 extend between the two ends 2 and 3 of the beam 1 and the hopper 4 is releasably connected to these strips by means including a spring-loaded locking pin 6A (FIGURE 2).

The frame is provided with aligned horizontal pins 7 and 8 for connection to the two lower links of the three-point lifting device of a tractor or like vehicle and a further fastening member (not shown) is mounted on the frame in such a position that it can co-operate with the upper adjustable link of the said device. In this way, the whole implement can be supported above, and moved over, the ground by means of a tractor or like vehicle. The lower end of the hopper 4 opens into a cylindrical annulus 9 which, in turn, bears upon a central region of the upper surface of a rotatable bladed spreading member 10. The annulus 9 is formed with three outlet ports 11, 12 and 13, through which material contained in the hopper 4 can reach the spreading member 10.

The annulus 9 is prevented from rotating with the spreading member 10 by means of a mechanism generally indicated by the reference numeral 14. The mechanism 14 includes a bent rod 15 whose opposite ends are entered in holes formed in lugs 16 and 17 respectively, which lugs are rigidly secured to the annulus 9. One end of an arm 18 is rigidly secured to the rod 15 and a pin 19 projects vertically downwardly from the opposite end of the arm. The longitudinal axis of the annulus 9 coincides with the axis of rotation 24 of the spreading member 10 and the annulus 9 can therefore be turned about this axis by means of the mechanism 14 and can be retained in any one of a number of different settings by inserting the pin 19 into any one of several holes 20 formed in a frame beam 21 or any one of a number of additional holes 22 formed in a strip 23 integral with, or rigidly secured to, the frame beam 21.

The cylindrical annulus 9 surrounds a similarly shaped outlet portion 25 of the hopper 4, the longitudinal axis of this portion also coinciding with the axis of rotation 24 of the spreading member 10. Upon moving the pin 19 from one of the holes 20 or 22 to another hole, the angular positions of the outlet ports 11, 12 and 13, about the axis of rotation 24 are changed so that material passing through these ports will fall onto the spreading member 10 at a corresponding position. The distribution spectrum of the implement, that is to say, the position of the strip of ground which received powdered or granular material relative to the implement when the implement is in operation, can thus be controlled.

In order to control the rate of flow of the material through the outlet ports 11, 12 and 13, masking plates 26, 27 and 28 are movable into positions in which they mask the said ports to a greater or lesser extent. The masking plates 26 to 28 are rigidly secured to a cylindrical ring 29 which surrounds the annulus 9 and which bears against the lugs 16 and 17 and also against a pin 30 (FIGURE 1) which projects from the outer wall of the annulus 9 at a location very approximately midway between the lugs 16 and 17 around the axis 24. The setting of the masking plates 26, 27 and 28 relative to the outlet ports 11, 12 and 13 is effected by means of an adjusting mechanism generally indicated by the reference numeral 31. The mechanism 31 comprises an arm 32 provided at one end with a pair of lugs which, by means of a horizontal pivot pin 33, are turnably connected to two further lugs 34 projecting from the ring 29. The opposite end of the arm 32 carries a horizontally disposed strip or plate 35 upon which a scale is marked. A stop 36 is adjustable in position relative to the strip 35 and can be clamped in a desired setting relative to the latter with the aid of a wing nut 37.

The arm 32 carries a vertically disposed lug 38 to which an eye 40 is attached by means of bolts 39. The eye 40 is engaged by one end of a tension spring 41 whose other end is fastened to a hook 42 fixed to the bar 15. The spring 41 tends to move the adjusting mechanism 31 in the direction indicated by the arrow 43 in FIGURE 1. However, this movement is limited by a stop 44 in the path of the stop 36, the stop 44 being connected to the arm 18 by means of a further arm 45. One end of a leaf spring 46 is clamped between the lug 38 and the eye 40 by means of the bolts 39 and the other end of this spring carries a block 47 adapted to co-operate with a pin 48 which projects upwardly from an arm 49 secured to the arm 18. The arms 45 and 49 project from opposite sides of the arm 18 and are arranged substantially in line with one another. The block 47 includes a stop 50 having a V-shaped recess and a curved guide lug 51 (see FIGURES 4 and 5). The surfaces of the stop 50 are arranged to co-operate in guiding the pin 48. The block 47 also includes a staple or the like 53 to which one end of a rope or wire 54 is secured. The rope or wire 54 is guided around a horizontally disposed pulley 55 mounted in a bracket 56 connected to the arm 18 adjacent the pin 19. As shown in FIGURES 1 and 3, the rope or wire may also be guided around a steeply curved portion of the beam 1.

The pin 48 is spaced from the axis of rotation 24 of the spreading member 10 by a distance 57 (FIGURE 3) while the block 47 is so arranged that one end of a guide face 52 (FIGURES 1 and 4) of the stop 50 is spaced from the axis 24 by a distance 58 (FIGURE 1). The distances 57 and 58 are approximately equal.

During the operation of the implement, the spreading member 10 is rotated about the axis 24 in the direction indicated by the arrow 10B in FIGURE 1 by means of, for example, the power take-off shaft of the tractor or like vehicle which is supporting the implement. Material from the hopper 4 passes through the more or less open ports 11, 12 and 13 to the bladed spreading member 10 which ejects the material on to the ground. The outlet ports 11, 12 and 13 may be closed to a greater or lesser extent by the masking plates 26, 27 and 28 by turning the ring 29 about the axis 24 with the aid of the adjusting mechanism 31. The angular positions of the masking plates 26 to 28 are determined by the position of the stop 36 which limits the extent to which the arm 32 can be moved by the tension spring 41 in the direction indicated by the arrow 43. The stop 36 has a point which is adapted to co-operate with the scale marked on the strip 35 so that a desired setting can readily be obtained. For example, in the position of the stop 36 shown in FIGURE 1 of the drawings, the point of the stop is opposite the digit "8" and the masking plates 26 to 28 are in positions which are such that the outlet ports 11 to 13 are open to about 8/10 of their maximum open area.

When the implement is being turned at the end of a strip of land which has been spread with material, it is desirable that the ports 11, 12 and 13 should be temporarily closed while the position of the stop 36 is maintained so that the same setting of the outlet ports can be employed for the next strip of land without any need for re-adjustment. In order to effect a rapid closure of the ports 11 to 13, the rope or wire 54 is pulled in the direction indicated by the arrow 59 in FIGURE 1. The resilient connection afforded by the leaf spring 46 is thus stressed so that the block 47, the adjusting mechanism 31 and the ring 29 all turn about the axis of rotation 24 in the direction 10B. This turning movement eventually brings the face 52 of the stop 50 into abutting engagement with the pin 48 so that the block 47 is moved radially inwardly towards the axis 24 with a consequent increase in the stress of the leaf spring 46. A further pull on the rope or wire 54 causes relative movement between the stop 50 and the pin 48 until the pin 48 comes into engagement with the concave face 60 (see FIGURE 4) of the guide lug 51.

When this condition is reached, the operator of the implement relaxes the pull upon the rope or wire 54 so that the mechanism 31 tends to return in the direction 43 under the influence of the tension spring 41. However, the guide lug 51 is so arranged that, when the pin 48 leaves the recess 60, it moves into the V-shaped recess of the stop 50. This is due to the fact that the leaf spring 46 tends to move the block 47 substantially radially outwardly relative to the axis 24. The adjusting mechanism thus remains at rest in the position indicated in FIGURE 3, this position being maintained by virtue of the fact that the leaf spring 46 is stronger than the tension spring 41 so that the mechanism 31 cannot move in the direction indicated by the arrow 43 in FIGURE 1.

When the outlet ports 11, 12 and 13 are completely closed the masking plate 26 abuts against the lug 16. The plate 26 will contact the lug 16 immediately before the block 47 comes into contact with the pin 48 so that further movement of the block 47 in response to the pull upon the rope or wire 54 is possible only by deformation of the leaf spring 46. When the pin 48 is lodged in the V-shaped recess of the stop 50, the spring 46 is still stressed, this tending to maintain the plate 26 in contact with the lug 16. In order to prevent the block 47 from fouling the arm 49, the end 49A (see FIGURE 5) of that arm is bent slightly downwardly.

When the outlet ports 11, 12 and 13 are to be re-opened, the operator of the implement once again pulls the rope or wire 54 in the direction indicated by the arrow 59 so that, as will be seen from FIGURE 3, the block 47 is moved in such a way that the pin 48 leaves the V-shaped recess of the stop 50. As soon as the pin 48 is entirely free of contact with the block 47, the operator of the implement relaxes the pull on the rope or wire 54. The stress in the spring 46 then moves the block 47 radially outwardly away from the axis 24 so that, during the movement of the adjusting mechanism 31 in the direction of the arrow 43 under the influence of the spring 41, the path moved through by the stop 50 no longer embraces the pin 48. The spring 41 thus rapidly returns the mechanism 31 to the position shown in FIGURE 1.

The closing of the outlet ports 11, 12 and 13 can be carried out in the manner just described irrespective of the settings of the annulus 9 and ring 29.

In order to facilitate the construction and assembly of the implement, it is desirable that the annulus 9 should surround the cylindrical outlet part 25 of the hopper 4 with an appreciable clearance and that the ring 29 should, in turn, surround the annulus 9 with a similar clearance. It will be realized that the distance 57 will vary in accordance with the clearance between the parts 9 and 25 while the distance 58 will vary in accordance with the clearance just mentioned and also the clearance between the parts 9 and 29. The stop 50 and the pin 48 can still co-operate readily despite differences in the distances 57 and 58 due to the fact that when the rope or wire 54 is pulled in the direction indicated by the arrow 59, the whole of the block 47 can move radially of the axis 24 due to its resilient connection with the arm 32 by way of the leaf spring 46. The length of the face 52 of the stop 50 is preferably such that this face always meets the pin 48 when the ports 11, 12 and 13 are closed with the aid of the flexible member such as a rope or wire 54 even when a relatively large difference exists between the two distances 57 and 58. In order to prevent the difference between the distances 57 and 58 from becoming too great, it is advantageous, in certain cases, to arrange a raised circular disc 10A (see FIGURES 1 to 3) in the center of the spreading member 10 in such a way that the center of the disc 10A coincides with the axis 24. The disc 10A has a diameter which is very slightly less than the internal diameter of the annulus 9 so that movements of the annulus, and hence of the ring 29, in directions perpendicular to the axis 24 are reduced to a minimum.

Although FIGURES 1 to 5 show the block 47 and co-operating pin 48 applied to an implement for spreading powdered or granular material over the ground, it will be clear that a similar arrangement may be employed in other agricultural implements in which it is necessary that relatively movable members should be retained in different relative settings under various circumstances.

FIGURES 6 to 9 illustrate an alternative embodiment of an implement for spreading powdered or granular material over the ground, those parts of the implement which correspond to the parts already described being designated by the same reference numerals as those previously used. In the embodiment to be described the parts 46 to 50 of the implement illustrated in FIGURES 1 to 5 are replaced by other parts.

A pin 61 projects upwardly from a location adjacent the radially innermost end of the arm 32, one end of an additional arm 62 being turnable about this pin. The opposite end of the arm 62 carries an additional vertical pin 64 about which a stop member, generally indicated by the reference numeral 63, is turnable. An accurately curved bar 65 is secured to the arm 62 and passes through a hole formed in a lug 66 projecting upwardly from the arm 32. A washer 67 is disposed around the bar 65 and bears against one edge of the arm 67, a helical compression spring 69 being wound around the bar 65 with its opposite ends bearing against the lug 66 and the washer 67. A split pin or the like 68 is entered in a transverse bore in the end of the bar 65 remote from the arm 62 to prevent disengagement of the bar from the hole in the lug 66. An arm 70, corresponding to the arm 49 previously described, is secured to the arm 32 and carries two vertical pins 71 and 72 which are spaced apart from each other and are different distances from the axis 24. The pins 71 and 72 co-operate with the stop member 63. The free end of the arm 62 is bent upwardly to form an apertured portion 73 to which the end of the rope 54 is anchored. The arrangement of the springs 41 and 69 is such that the spring 69 is the stronger of the two.

In the position shown in FIGURE 6 of the drawings, the outlet ports 11, 12 and 13 are completely closed by the masking plate 26, 27 and 28, this position thus corresponding to the position shown in FIGURE 3. In order to open the outlet ports 11, 12 and 13, the operator of the implement pulls the rope or wire 54 in the direction indicated by the arrow 59 in FIGURE 6, it being noted that, in this instance, the rope or wire 54 is guided through an eye 74 mounted on the beam 21 rather than around a part of the beam 1. The arm 62 is turned about the pin 61 with a consequent compression of the spring 69. The arm 32 does not turn similarly since the plate 26 is in abutting engagement with the lug 16. The arm 62 turns about the pivot pin 61 in the direction indicated by the arrow 75 in FIGURE 6 and, eventually, the side 76 of the stop member 63 meets the pin 71 with the result that the stop member 63 is turned about the pivot pin 64 into the position shown in FIGURE 7. Upon the pull on the rope or wire 54 being relaxed, the spring 69 turns the arm 62 in the direction opposite to the direction 75 while, in addition, the spring 41 turns the whole of the adjusting mechanism 31 in the direction 43. This brings the side 78 (opposite to the side 76) of the stop member 63 into engagement with the pin 72 so that the stop member 63 is turned about the pivot pin 64 into the position shown in FIGURE 8.

The distance 79 between the axis 24 and the pin 72 slightly exceeds the distance 80 between the pin 64 and the axis 24 plus half the width 81 (FIGURE 8) of the stop member 63. The stop member 63 can thus move past the pin 72. The whole adjustment mechanism is thus moved by the springs into a position, corresponding to that shown in FIGURE 1, in which the stop 36 engages the stop 44. In this position the outlet ports 11 to 13 are open to an extent dependent upon the setting of the stop 36 relative to the scale on the strip or plate 35.

When it is required to close the ports 11, 12 and 13 completely, the operator of the implement once again pulls the rope or wire 54 in the direction indicated by the arrow 59 which brings a V-shaped notch 82 at one end of the stop member 63 into engagement with the pin 71 thus turning the stop member 63 through a small angle about the pivot pin 64 to bring it to approximately the position shown in FIGURE 9. Upon freeing the rope or wire 54, the arm 62 turns through a small angle in a direction opposite to the direction 75, this bringing a V-shaped notch 83, symmetrical with the notch 82, into engagement with the pin 72. In this position, which is shown in FIGURE 6, the mechanism 31 cannot be moved by the springs 41 and 69 and the ports 11, 12 and 13 are completely closed.

The stop member 63 cannot pass the pin 72 when the notch 83 is in engagement therewith due to the fact that the distance 79 is less than the sum of the distance 80 and the distance between the pin 64 and the effective base of the notch 83. Means, such as a spring washer or the like (not shown), is preferably provided in engagement with the stop member 63 to prevent the latter from being turned about the pivot pin 64 at times other than those when it is positively engaged by either the pin 71 or the pin 72. Each of the complete cycles described rotates the stop member through 180° about the pivot pin 64.

It will be clear that the implements already described may be employed for purposes other than agricultural. For example, they may be employed for spreading sand, salt or the like upon slippery or iced road surfaces.

FIGURES 10 to 15 show part of an implement for spreading powdered or granular material over the ground, only one frame beam 91 appearing in these figures. The implement comprises a hopper 95 (FIGURE 14) below which a rotatable bladed spreading member 92 is disposed. A cylindrical annulus 93 surrounds a cylindrical outlet portion 94 of the hopper 95 and bears against the upper surface of a central region of the spreading member 92. The material from the hopper 95 can reach the spreading member 92 through three outlet ports 96, 97 and 98 formed in the wall of the annulus 93. The annulus 93 carries two lugs 99 and 100 formed with holes 101 and 102 in which the bent-over ends 103 and 104 of a bar 105 are received. Split pins or the like (not shown) are provided in transverse bores in the ends 103 and 104 to prevent these latter from becoming disengaged from the holes 101 and 102. One end of an arm 106 is secured to the bar 105, the other end 107 of which arm is disposed above the frame beam 91. The arm 106 has a lug 108 welded to it in such a way that the greater part of the said lug extends beneath the frame beam 91 (see FIGURE 11). The arm 106 also carries a securing pin 109 which can be entered into any one of a number of holes 110 (FIGURE 10) formed in the frame beam 91.

The securing pin 109 is connected with the arm 106 by a resilient member 111 in the form of a length of spring steel rod or wire, the member 111 having a horizontal portion 112 (FIGURE 10), a curved portion 113, a further horizontal portion 114, and an inverted U-shaped portion 115 (see FIGURE 12). The pin 109 itself is formed adjacent the free end of the portion 115. The portion 112 is secured to the lower side of the arm 106 by means of a bolt 116 and the securing pin 109 is taken through a slot 176 in the end 107 of the arm 106. A blind hole 175 is also formed in the upper side of the end 107 of the arm 106 adjacent the slot 176.

The annulus 93 is surrounded by a ring 117 which bears upon the lugs 99 and 100 and also upon a projection 118 of the annulus 93 disposed approximately midway between the lugs 99 and 100 around the axis of rotation 173 of the spreading member 92. The ring 117 carries three masking plates 119, 120 and 121 which are arranged to mask the outlet ports 96, 97 and 98 to a greater or lesser extent. The masking plates 120 and 121 are provided with rounded edges 166 and 167 respectively (see FIGURES 10 and 15). The ring 117 has two lugs 122 and 123 which are spaced apart from one another and to which the radially innermost end of an arm 124 is connected by means of a horizontal pivot pin 124A.

The radially outermost end of the arm 124 carries a strip or plate 125 upon which a scale is marked, a pointed stop 126 being adjustable to desired positions along the scale and being arranged to be clamped to the strip or plate 125 by means of a wing nut 127. The bar 105 carries a short inclined arm 128 to the uppermost free end of which one end of a tension spring 129 is connected. The other end of the tension spring 129 is secured to a lug 130 provided at the radially innermost end of the arm 124 adjacent the pivot pin 124A. One end of a leaf spring 131 is bolted to a portion of the lug 130, the other end 132 of the leaf spring carrying a block 133. The block 133 has a stop 134 affording a V-shaped recess 135. In addition, the block 133 comprises a guide lug 136 having a concave recess 165.

The block 133 is coupled to one end of a rope or wire 137 which passes around a guide pulley 138 rotatably journalled on a shaft 139 disposed at an angle 140 (FIGURE 11) of about 18 degrees of the vertical. The angle 140 should in all cases exceed 5°. The guide pulley 138 retained in position on the shaft 139 by means of a plate 142 arranged around the shaft 139 at a level above that of the pulley 138. The plate 142 is itself prevented from disengagement with the shaft 139 by means of a pin 143 entered in a transverse bore in the shaft 139. The plate 149 is similarly engaged around a shaft 144 which is also secured to the support 141, a transverse pin 146 acting in a similar manner to the pin 143 in respect of the shaft 144. A spacing sleeve 145 surrounds the shaft 144 between the plate 142 and the support 141.

A pin 148 is connected to the arm 106 by means of a length of resilient rod or wire 149 (FIGURE 12). The resilient rod or wire 149 has two horizontal straight portions 150 and 151 interconnected by a curved portion 152, the portions 150 and 151 extending at an angle of less than 90° (in this case approximately 15°) to one another. The pin 148 is formed by the upwardly bent end of the portion 150. The bolt 116 which serve to connect the pin 109 to the arm 106 serves also to connect the pin 148 to the arm 106. If desired, the two lengths of resilient rod or wire of which the pins 109 and 148 form parts may be integral with one another as shown in the drawings. The portions 112 and 151 are connected to one another by a 180° bend 153 arranged around the bolt 116 against the lower side of the arm 106.

The arm 106 carries a stop 154 which is arranged to co-operate with the stop 126. The underside of the arm 106 has a guide face 154A (FIGURES 10 and 13) which extends transverse to the length of the arm 106 in such a way that the pin 148 is disposed immediately in front of it considered in the intended direction of travel of the implement. The stop 134 has an inclined or slanting edge 155 which is arranged to co-operate with the guide face 154A.

On the opposite side of the annulus 93 from the tension spring 129, a further tension spring 156 is stretched between the free end of an upwardly inclined arm 157 secured to the annulus 93 and the free end of a horizontally extending arm 158 secured to the ring 117. The arrangement of the arms 157 and 158 is such that the spring 156 is substantially horizontally disposed. As can be seen in FIGURE 10 of the drawings, the springs 129 and 156 are removed from one another around the axis of rotation 173 by an angle of approximately 180°.

In the position shown in FIGURE 10, the masking plates 119, 120 and 121 completely close the outlet ports 96, 97 and 98. Thus, the point of the stop 154 is in register with the mark "0" of the scale on the strip or plate 125. The ring 117 is retained in position to close the outlet ports due to the engagement of the stop 134 with the pin 148, the pin 148 being located in the V-shaped recess 135. When it is desired to wholly or partly open the outlet ports 96 to 98, the operator of the implement pulls the wire or rope 137 so that the block 133 moves in the direction indicated by the arrow 159 in FIGURE 10. The oblique position of the pulley 138 facilitates this pulling motion without tending to cause raising of the arm 106 due to the provision of the lug 108. The pulling movement causes relative sliding motion between the pin 148 and a surface 160 of the recess 135. When the pin 148 reaches the end of the surface 160, the resilient mounting of the pin causes it to move a short distance in the direction indicated by the arrow 161 in FIGURE 10 while the resilient mounting of the block 133 causes the latter to move a similar distance in a substantially opposite direction.

When the operator ceases to pull upon the rope or wire 137, the block 133 moves in the direction indicated by the arrow 162 under the action of the tension springs 129 and 156. The block 133 thus slides past the pin 148 with a side surface 163 thereof in engagement with the pin. During the movement of the block 133 in the direction indicated by the arrow 162 the arm 124 together with the strip or plate 125 and the ring 117 turns about the annulus 93 in a direction opposite to the direction of rotation 172 of the spreading member 92 to allow the masking plates 119 to 121 to open the outlet ports 96 to 92 to a greater or lesser extent.

The ring 117 can only turn in a direction opposite to the direction 172 until the stop 126 meets the stop 154. When the stop 126 occupies the position shown in FIGURE 10, that is to say, opposite the scale marking "10," the outlet ports 96 to 98 will be fully opened. In order to obtain a partial opening of these ports, the wing nut 127 is loosened and the stop 126 is moved to a position on the strip or plate 125 in which it is opposite an alternative scale marking, for example, the mark "5." The outlet ports 96 to 98 will then be opened to half their maximum area.

When the outlet ports 96 to 98 are to be closed completely, the operator of the implement pulls the rope or wire 137 so that the block 133 is moved in a direction opposite to that indicated by the arrow 162. Since the block 133 is connected to the arm 24 and ring 117 by the leaf spring 131, the ring 117 together with the masking plates 119 to 121 turns about the annulus 93 in the direction indicated by the arrow 172. During this movement a side surface 164 of the stop 134 slides relative to the pin 148 while the inclined edge 155 (FIGURE 13) of the said stop comes into contact with the guide face 154A. This ensures that the stop 134 and pin 148 meet one another at the correct relative levels. After passing along the face 164 of the stop 134, the pin 148 enters the concave recess 165 of the guide lug 136 so that the said concave prevents the block 133 from moving any further in the direction 159. The operator of the implement then releases the rope or wire 137 so that the block 133 once again moves in the direction 162 under the influence of the springs 129 and 156. However, this movement brings the pin 148 into the V-shaped recess 135 of the stop 134 so that, in fact, only a very small movement in the direction 162 takes place. The arm 124 is thus retained in the position shown in FIGURE 10 in which position the masking plates 119 to 121 completely close the outlet ports 96 to 98.

The block 133 and the arm 124, together with the parts secured thereto, constitute an element connected to the ring 117 which is itself adjustably movable relative to the annulus 93, the said element co-operating with a further element formed by the pin 148, the arm 106 and the associated parts, the two elements together constituting adjusting mechanism for opening and closing the outlet ports 96 to 98. It will be apparent that both closing and opening of these ports is effected merely by pulling in the same direction upon the rope or wire 137.

The leaf spring 131 must be stronger than the two tension springs 129 and 156 in order that the arm 124, the ring 117 and the plates 119 to 121 shall move in the direction 127 when a pull is exerted on the rope or wire 137 since the springs 129 and 156 tend, in fact, to turn the parts just mentioned in the opposite direction. The pin 148 is resiliently mounted relative to the arm 106 in order to ensure a correct co-operation of this pin with the block 133 since it is necessary that the stop 134 and the pin 148 should be movable relative to one another in the direction indicated by the arrow 161 and in the opposite direction. Although it might appear that the resiliency of the leaf spring 131 would alone be sufficient to provide the correct co-operation just mentioned, it is pointed out that the said leaf spring must have a substantial rigidity if its strength is to exceed that of the springs 129 and 156. It will be apparent that the pin 148 may be resiliently connected to the arm 106 by means other than those described. For example, a further leaf spring or the like may be employed.

As previously mentioned, the masking plates 120 and 121 are provided with rounded edges 166 and 167. When the outlet ports 96 to 98 are only partly open, the said edges 166 and 167 are located radially in front of the wall portions 168 and 169 (see FIGURE 15) of the annulus 93 which portions lie on opposite sides of the middle outlet port 97. However, when the ports are completely open, the said edges 166 and 167 coincide radially with the edges 170 and 171 (see FIGURE 15) of the outlet ports 96 and 97 respectively. It will be apparent that, during operation, material leaving the outlet ports and falling onto the spreading member 92 which is rotating in the direction 172 will meet the edges 166 and 167 of the plates 120 and 121 where these edges coincide with the edges 170 and 171 just mentioned. Minor blockages of the material can occur at these points, such blockages tending to interfere with the spreading of the material. It has been found that the rounding off of the edges 166 and 167 substantially reduces the tendency for such blockages to occur. Since the masking plate 119 does not have an edge lying in the path of the material when the outlet ports are fully open, it is unnecessary for this plate to be given a rounded edge.

The relative dispositions of the springs 129 and 156 are such that the ring 117 will not be moved into an oblique or skew position relative to the annulus 93 so that the ring 117 can readily be turned relative to the annulus 93. In this connection, it will be appreciated that the annulus 93 and ring 117 can turn together about the axis of rotation 173 of the spreading member 92 without relative movement taking place between them.

By withdrawing the securing pin 109 from one of the holes 110 with the aid of the portion 115, the arm 106 can be turned about the axis 173 to a position in which the slot 176 is in register with another hole. Both the annulus 93 and the ring 117 are turned through the same angle since the arm 124, and thus the ring 117, is connected to the arm 106 by the springs 129, 156 and 131.

As previously stated, the securing pin 109 is withdrawn from one of the holes 110 by moving the portion 115 by hand in the direction indicated by the arrow 174 in FIGURE 12. In order to facilitate the turning movement of the arm 106, the pin 109 is lodged temporarily in the blind hole 175 as shown in broken lines in FIGURE 11. When the slot 176 is in register with a new hole 110, the securing pin 109 is released from the blind hole 175 and allowed to drop into the aligned slot 176 and hole 110.

The distance 177 (FIGURE 11) between the securing pin 109 and the radially innermost end 178 of the slot 176 is such that the annulus 93 together with the ring 117 and the arm 106 can move relative to the beam 91 in the direction indicated by the arrow 179 through a distance approximately equal to the distance 177. The short vertically disposed portion 181 of the lug 108 is spaced an approximately similar distance 180 from the radially innermost edge of the beam 91 to allow the movement just mentioned to take place. It is necessary to be able to move the annulus 93 and the associated parts in the direction 179 to allow the hopper 95 to be disengaged from the frame of the implement. When the hopper 95 is being uncoupled, it is tilted relative to a strip provided on its rear side so that its lowermost outlet portion 94 must move a certain distance in the direction 179. This necessarily entails a similar movement of the annulus 93. It will be appreciated that, if desired, the resiliently mounted securing pin 109 may be replaced by a pin fixed rigidly to the arm 106. With this arrangement the movement just described can still be effected by forming the holes 110 as elongated slots extending radially of the axis of rotation 173.

FIGURES 16 to 18 illustrate an implement for spreading powdered or granular material over the ground, only one frame beam 191 of the implement appearing in FIGURE 16. The implement has a hopper 190 (FIGURE 17) having a cylindrical outlet portion 189 surrounded by a cylindrical annulus 193 whose lowermost edge bears against a central region of a bladed spreading member 192 which is rotatable about an axis 221. Material from the hopper 190 is fed to the spreading member 192 through three outlet ports 194, 195 and 196 formed in the annulus 193.

The annulus 193 has two horizontally extending lugs 197 and 198 which are formed with holes 199 and 200 through which the bent-over ends 201 and 202 of a rod 203 are entered. The said ends 201 and 202 are prevented from becoming dislodged from the said holes by means of split pins or the like (not shown) taken through transverse bores formed in the said ends. One end of an arm 205 is secured to the rod 203, the arm 205 forming part of an adjusting mechanism. The other end 206 of the arm 205 is located immediately above the frame beam 191.

A spring steel rod 208 is secured to the arm 205 by a bolt 207, the rod 208 comprising two straight portions 209 and 210 extending parallel to one another away from the bolt 207 approximately perpendicularly to the length of the arm 205. A further straight portion 211 is connected to the portion 209 by a bend 212 of approximately 165°, the portion 211 extending across the underside of the arm 205 and terminating in an upwardly extending pin 213 located on the opposite side of the arm 205 from the portion 209. The portion 210 is connected to a further straight portion 215 by means of a bend 214 of about 135°. The portion 215 is connected by way of a U-shaped portion 216 (similar to the portion 115 previously described) to a further straight portion 217 whose free end is bent-over to form a downwardly directed securing pin 218. The pin 218 passes through an elongated slot 219 formed in the end 206 of the arm 205 and through one of a number of holes 220 formed in the frame beam 191, the holes 220 being arranged in a curved row whose center of curvature is afforded by the axis of rotation 221 of the spreading member 192. A blind hole 222 is formed in the upper surface of the arm 205 adjacent the slot 219.

A ring 223 is arranged around the annulus 193 and is supported by the lugs 197 and 198 and by a projection 224 of the annulus 193 which projection is arranged approximately midway between the lugs 197 and 198 around the axis 221. The ring 223 carries three masking plates 225, 226 and 227 which plates are arranged to mask the outlet ports 194, 195 and 196 to a greater or lesser extent. The said ports can be opened or closed to a greater or lesser extent by rotation of the ring 223 relative to the annulus 193. The ring 223 has two vertically or lesser extent by rotation of the ring 223 relative to the annulus 193. The ring 223 has two vertically disposed spaced lugs 228 and 229 secured to it, the radially inner end of an arm 213 being turnable relative to these lugs about a horizontal pivot pin 230. The pin 230 is retained against axial displacement by split pins or the like 232 arranged in transverse bores in its opposite ends. The other end of the arm 231 carries a strip or plate 233 upon which a scale is marked. A stop 234 having a pointer adapted to co-operate with the scale is movable relative to the strip or plate 233 and can be clamped in a selected setting by means of a wing nut 235.

The arm 231 is provided with a vertical lug 236 at a position adjacent to the pin 230. One end 238 of a leaf spring 239 is secured to the lug 236 by means of bolts 237. The said end 238 is substantially tangential to a circle whose center coincides with the axis 221. The end 238 is connected by a bend of about 130° to a portion 240 which is also tangential to a similar circle. The portion 240 merges into a curved portion 241 which is concentric with the axis 221 and which surrounds the annulus 193 over an arc subtending an angle of about 250° at that axis. The portion 241 merges into a straight end portion 242 which is again tangential to a circle whose center lies upon the axis 221. The end portion 242 is sandwiched between the limbs 243 and 244 (see FIGURE 18) of a fork fastened to the bar 203. The extreme free end 245 (see FIGURE 16) of the portion 242 is bent over so that the portion 242 cannot become disengaged from the limbs 243 and 244 by performing a movement in a horizontal direction. However, the end portion 242 can readily be removed from between the limbs of the fork merely by lifting it vertically from between the said limbs.

One end of a leaf spring 246 is also secured to the lug 236 by means of the bolts 237, the other end 247 of the said leaf spring having a block 249 fastened to it by means of bolts 248. The block 249 includes a stop 250 having a V-shaped recess 251 and also a guide lug 252 having a concave curved recess 264. One end of a rope or wire 253 is also anchored to the block 249, the said rope or wire 253 being guided around a pulley 254. The pulley 254 is turnable about a shaft 255 which is inclined at an angle of about 80° to the horizontal. The shaft 255 is secured to a support 256 which is welded or otherwise secured to the upper side of the arm 205. A second shaft 257 spaced from the shaft 255 is also fixed to the support 256. The pulley 254 is retained on the shaft 255 by means of a plate 258 through holes in which both the shafts 255 and 257 are taken. A spacing sleeve (not shown) extends around the shaft 257 between the plate 258 and the support 256. The plate 257 is itself secured against disengagement from the shafts 255 and 257 by means of pins 259 taken through transverse bores adjacent the uppermost ends of said shafts.

The arm 205 also carries a stop 260 which is adapted to co-operate with the stop 234 and also an arm 261 which extends transversely of the arm 205 in such a way that its free end is disposed closely adjacent to the pin 213. The portion 211 of the bar 208 bears against the lower side of the arm 261.

In the position of the implement shown in FIGURES 16 to 18 of the drawings, the masking plates 225 to 227 completely close the outlet ports 194 to 196. The arm 231 occupies a position which is such that the scale indirectly carried thereby has the mark "0" opposite the point of the stop 260. This position is maintained due to the engagement of the pin 213 of the bar 208 in the V-shaped recess 251 of the stop 250.

When it is desired to wholly or partly open the outlet ports 194, 195 and 196, the rope or wire 253 is pulled by the operator of the implement so that the block 249 moves in the direction indicated by the arrow P in FIGURE 16. The pin 213 thus slides along the face 262 of the stop 250 and, eventually, becomes disengaged from the stop. At this instant, the resiliently mounted pin 213 moves a short distance in the direction indicated by the arrow Q in FIGURE 16 while the resiliently mounted block 249 moves a short distance in the opposite direction. As soon as the pull on the rope or wire 253 is relaxed, the annulus 223 turns in the direction indicated by the arrow R under the action of the leaf spring 239 while the block 249 slides past the pin 213 with a side surface 263A of the stop 250 in engagement with the said pin.

The ports 194 to 196 are unmasked by the plates 225 to 227 to an extent depending upon the setting of the stop 234. It will be appreciated that movement in the direction R is arrested as soon as the stop 234 meets the stop 260. When the stop 234 is arranged with its point opposite the mark "10" on the scale on the strip or plate 233, the outlet ports 194 to 196 will be opened to their maximum extent but, clearly, they may be opened to a lesser extent by clamping the stop 234 opposite an alternative scale marking such as, for example, the mark "5."

When the outlet ports 194 to 196 are to be completely closed, the operator of the implement pulls the rope or wire 253 so that the block 249 is moved in the direction indicated by the arrow S in FIGURE 16. Since the block 249 is connected with the ring 223 by way of the leaf spring 246 and the arm 231, the ring 223, together with the masking plates 225 to 227, will turn in a direction opposite to the direction indicated by the arrow R. Movement of the block 249 in the direction S brings the side 263 of the stop 250 into sliding engagement with the pin 218. As soon as the end of the side 263 is reached, the pin 213 moves into the concave recess 264 of the guide lug 252 whereafter further movement of the block 239 in the direction P or S is prevented. Upon the operator of the implement releasing the rope or wire 253, the block 249 moves a short distance in a direction opposite to that indicated by the arrow P, thus bringing the pin 213 into the V-shaped recess 251 of the stop 250. The movement of the block 249 takes place under the action of the springs 246 and 239. The ring 223 is then once again held in the position shown in FIGURE 16 of the drawings in which position the outlet ports 194 to 196 are completely closed. The lowermost face of the block 249 is slightly rounded so that it will slide easily onto the arm 261 to take up its correct vertical position relative to the pin 213.

When it is desired to turn the annulus 193 about the axis 221 to vary the distribution spectrum of the implement, the securing pin 218 disposed at one of the ends of the rod 208 is lifted from the hole 220 which it occupies and from the slot 219 by means of the portion 216 and is lodged in the blind hole 222. The arm 205 can then be turned about the axis 221 together with the annulus 193 to a position in which the slot 219 is in register with a different one of the holes 220. The securing pin 218 is then lifted from the blind hole 222 and is passed through the slot 219 and the new hole 220.

What I claim is:

1. In an agricultural implement having a hopper and a rotatable spreader for receiving material from the lower end of said hopper, the combination of control means located between said hopper and said spreader for regulating the flow of material to said spreader, said control means including a member having at least one outlet port and movable masking means for covering said port, adjusting means for positioning said masking means relative to said port, said adjusting means including a turnable arm connected to said masking means, a relatively stationary arm provided with a pin and spring-mounted stop means associated with said turnable arm for engaging said pin and biasing said turnable arm in a direction whereby said masking means is positioned relative to said port.

2. The invention of claim 1 wherein the spring-mounted stop means includes a leaf spring.

3. The invention of claim 1 wherein the spring-mounted stop means includes a further arm associated with said turnable arm by means of a connecting bar and a compression spring on said bar.

4. The invention of claim 1 wherein said stop means is provided with at least one V-shaped recess, said recess being adapted to cooperate with said pin.

5. The invention of claim 1 wherein the outlet port is closed by said masking means when the spring-mounted stop means is engaged with the pin.

6. The invention of claim 1 wherein said turnable arm is influenced by additional spring means in a direction opposite to the biased direction.

7. The invention of claim 1 wherein said stop means includes a guide lug and a V-shaped recess, whereby the pin and stop means can be engaged so as to be movable relative to one another in one direction and disengaged in substantially the same direction.

8. The invention of claim 1 wherein said stop means includes an element having a pair of V-shaped recesses arranged substantially opposite one another and the stationary arm is provided with a pair of pins.

9. The invention of claim 1 wherein the spring-mounted stop means is associated with said stationary arm by flexible means whereby, upon operation of said flexible means, said pin and stop means are moved relative to each other.

10. The invention of claim 1 wherein flexible means is attached to said spring-mounted stop means and a guide pulley for said flexible means is provided at one end of said stationary arm.

11. In an agricultural implement having a hopper and a rotatable spreader for receiving material from the lower end of said hopper, the combination of control means located between said hopper and said spreader for regulating the flow of material to said spreader, said control means including a member having at least one outlet port, and movable masking means for covering said port, adjusting means for positioning said masking means relative to said port, said adjusting means including a turnable arm connected to said masking means, a relatively stationary arm provided with a pin, said stationary arm being connected to said member and being positionable in a plurality of settings, spring-mounted stop means associated with said turnable arm for engaging said pin and biasing said turnable arm in a direction whereby said masking means is positioned relative to said port.

12. The invention of claim 11 wherein said stop means is provided with at least one V-shaped recess, said recess being adapted to cooperate with said pin.

13. The invention of claim 11 wherein said turnable arm is influenced by additional spring means in a direction opposite to the biased direction.

14. The invention of claim 11 wherein said stop means includes a guide lug and a V-shaped recess, whereby the pin and stop means can be engaged so as to be movable relative to one another in one direction and disengaged in substantially the same direction.

15. The invention of claim 11 wherein said stop means includes an element having a pair of V-shaped recessed arranged substantially opposite one another and the stationary arm is provided with a pair of arms.

16. The invention of claim 11 wherein said masking means includes a masking plate having rounded edges.

17. The invention of claim 11 wherein said pin comprises the end of a resilient spring member having a horizontal portion, a curved portion and a further horizontal portion connected to the stationary arm.

18. The invention of claim 11 wherein said stationary arm is movable along a frame portion having a plurality of holes, said stationary arm having a second pin selectively arrangeable in said holes and said second pin being resiliently connected to said stationary arm.

19. The invention of claim 11 wherein said turnable arm is influenced by additional spring means in a direction opposite to the biased direction, said additional spring means comprising at least one tension spring, said spring being attached to said turnable arm and said stationary arm.

20. The invention of claim 11 wherein said member having at least one outlet port comprises a cylindrical portion around which the masking means is arranged, said additional spring means being formed by a leaf spring bowed around at least a part of said cylindrical portion, one end of said additional leaf spring being fastened to said turnable arm and the other end being removably mounted between two limbs connected to said stationary arm.

References Cited in the file of this patent

UNITED STATES PATENTS

| | | |
|---|---|---|
| 391,861 | Ritter | Oct. 30, 1888 |
| 894,948 | Guthrie | Aug. 4, 1908 |
| 966,564 | Koegler | Aug. 9, 1910 |
| 2,535,414 | Heidger | Dec. 26, 1950 |
| 2,550,872 | Shaw | May 1, 1951 |
| 2,687,307 | Austermiller | Aug. 24, 1954 |
| 2,901,257 | Teagle | Aug. 25, 1959 |
| 2,953,999 | Hyland | Sept. 27, 1960 |
| 2,968,264 | Schnell | Jan. 17, 1961 |
| 3,025,068 | van der Lely et al. | Mar. 13, 1962 |
| 3,060,872 | Ackley | Oct. 30, 1962 |